United States Patent [19]
Nelson et al.

[11] Patent Number: 5,288,271
[45] Date of Patent: Feb. 22, 1994

[54] CONSTANT VELOCITY UNIVERSAL JOINT ASSEMBLY FOR DOWNHOLE MOTOR

[75] Inventors: Sharon P. Nelson, Conroe; Billy J. Roberts, Houston, both of Tex.

[73] Assignee: Houston Engineers, Inc., Houston, Tex.

[21] Appl. No.: 867,366

[22] Filed: Apr. 13, 1992

[51] Int. Cl.⁵ .................................................. F16D 3/16
[52] U.S. Cl. ...................................... 464/114; 464/147
[58] Field of Search .............................. 464/112–114, 464/117, 905, 133, 171, 173, 147; 403/57; 277/212 FB

[56] References Cited

U.S. PATENT DOCUMENTS

| | | |
|---|---|---|
| 1,349,197 | 8/1920 | Garman et al. .............. 464/171 X |
| 1,816,891 | 8/1931 | Boyden ........................ 464/171 |
| 2,394,890 | 2/1946 | Blomgren . |
| 2,451,791 | 10/1948 | Weaver ......................... 464/114 |
| 2,813,409 | 11/1957 | Wolcott . |
| 3,452,556 | 7/1969 | Einhorn . |
| 3,745,789 | 7/1973 | Orain ........................... 464/905 X |
| 3,800,555 | 4/1974 | Arneson ....................... 464/114 X |
| 4,157,022 | 6/1979 | Crase ........................... 464/173 X |
| 4,558,869 | 12/1985 | Grove et al. .................. 464/175 X |
| 4,560,368 | 12/1985 | Sherman, II et al. .......... 464/112 |
| 4,772,246 | 9/1988 | Wenzel ......................... 464/117 |
| 4,936,811 | 6/1990 | Baker .......................... 464/175 |
| 4,968,173 | 11/1990 | Fujita .......................... 403/57 |

FOREIGN PATENT DOCUMENTS 2927648  1/1981  Fed. Rep. of Germany .

Primary Examiner—Daniel P. Stodola
Assistant Examiner—Eileen Dunn
Attorney, Agent, or Firm—Vaden, Eickenroht, Thompson, Boulware & Feather

[57] ABSTRACT

An apparatus for use in transmitting torque between a first part rotatable about a fixed axis and a second part rotatable in a circular path about the axis, and which includes a torque bar having its ends connected to ends of the parts by universal joints.

6 Claims, 2 Drawing Sheets

CONSTANT VELOCITY UNIVERSAL JOINT ASSEMBLY FOR DOWNHOLE MOTOR

This invention relates generally to torque transmitting universal joints, and, more particularly, to improvements in such joints which are of the constant velocity type. In one of its aspects, this invention relates to apparatus having universal joints of this type for use in transmitting compressive loads as well as torque between a first part rotatable about a fixed axis and a second part which is rotatable in a circular path which surrounds the first axis.

In the drilling of an oil or gas well, particularly wherein a lower portion of the well bore is angled with respect to the upper portion, it is often the practice to rotate a bit at the lower end of the drill string by means of a downhole drilling motor. Many of these motors are of the type in which the bit is connected to a rotor for rotation with respect to a stator which is connected to the non-rotatable drill string in response to the circulation of drilling fluid between the rotor and stator. In one such motor, known as the Moineau type, the rotor is caused to follow a circular path about the axis of the stator.

Since the bit fits closely within the bore hole being drilled, and thus rotates about the axis of the drill string, it is necessary to connect the rotor to the bit by means of a universal joint, and, in the case of a Moineau type motor, to so connect them by apparatus which permits the rotor to follow the circular path above described. Furthermore, the joint must be of such construction as to not only transmit torque to the bit at a constant velocity, but also transmit large compressible loads thereto. Existing universal joints are either not sufficiently sturdy and durable, or too expensive to manufacture, or both, particularly for use in this environment, where the parts are susceptible to the deleterious effects of fluids within the well bore.

An object of this invention is provide a torque transmitting, constant velocity universal joint which is of sturdy and inexpensive construction and which consists of a minimum of parts which are easy to assemble and disassemble in the event it needs repair.

Another object is to provide apparatus including such joints which is particularly well suited for use in transmitting rotation as well as compression loads between the rotor of a downhole motor, particularly of the Moineau pump type, and a drill bit at the lower end of a drill string.

These and other objects are accomplished, in accordance with the illustrated and preferred embodiment of the invention, by a universal joint which comprises a first member having a cylindrically shaped recess extending transversely of an opening in one end thereof, a cylindrically shaped body closely received in said recess for rotation about a first axis and having a slot in one side with parallel sides and holes therethrough on opposite sides of the slot, a pin extending into the holes and across the slot along a second axis perpendicular to and intersecting the first axis, and a second member having a tongue with flat sides closely fitting within the slot and a hole therethrough closely fitting about the pin for rotation about the second axis. To disassemble the joint, the cylindrically shaped body is moved laterally out of the recess in the first member, and the pin is then removed from the holes in the body and the torque of the second member, which in turn permits the body to be removed from the torque. Thus, the joint is formed of a minimum number of parts which are easily assembled and disassembled.

In the illustrated embodiment of the invention, the first member comprises an inner body through which the recess is formed and a sleeve which is releasably connected to and surrounds the inner body so as to retain the cylindrically shaped body in the recess in the first member. Upon release of the sleeve, it may be moved axially of the inner body to a position in which the cylindrically shaped body may be moved out of the recess.

In the preferred embodiment of the invention, the second member of the joint also has an enlarged head with a spherical surface adjacent the tongue which is concentric to the intersection of said first and second axes, and a flexible boot is mounted on said second member and has a spherical surface which closely surrounds the spherical surface on the head to close the space between the members. More particularly, means are provided for retaining the boot within the sleeve outwardly of the head on the second member so as to sealably enclose the relatively slidable parts of the joint and thus protect them against hostile environments, such as drilling fluids, when the joint is used in a downhole environment. As illustrated, the boot is split about its circumference for assembly about the second member, and is retained by split rings which fit about the boot and a flange on the sleeve engaging on outer side of the split rings. Thus, the boot is also easily assembled and disassembled about the enlarged head on the second member of the joint.

In the preferred and illustrated embodiment of the invention, apparatus is provided for use in transmitting torque between a first part, which, in the case of a drill string having a downhole motor for rotating the bit, comprises a shaft connected to the bit and a second part connected to a rotor supported with a stator of the motor connected to the lower end of the drill string for rotation in response to the circulation of drilling fluid between the rotor and stator. As previously noted, in the case of a Moineau type pump, the rotor rotates in a circular path about the axis of the bit, in which case, in accordance with another novel aspect of the invention, the first part comprises a first sub for connection to the bit shaft, the second part comprises a sub for connection to the rotor, and a torque bar is connected at each end to one of the subs by means of a universal joint of the construction above described so as to accommodate the circular movement of the rotor while transmitting the necessary compressive loads as well as torque from the rotor to the bit.

In addition to its ability to withstand the high hydraulic thrusts to which such motors are subjected due to the pressure differential across them, this apparatus is able to accommodate not only the axial, but also the angular, misalignment which is often encountered in installations of this type. Thus, in some applications, the drill string may be deliberately bent to induce deflection of the well bore.

In the drawings, wherein like reference characters are used throughout to designate like parts:

Figure 1:
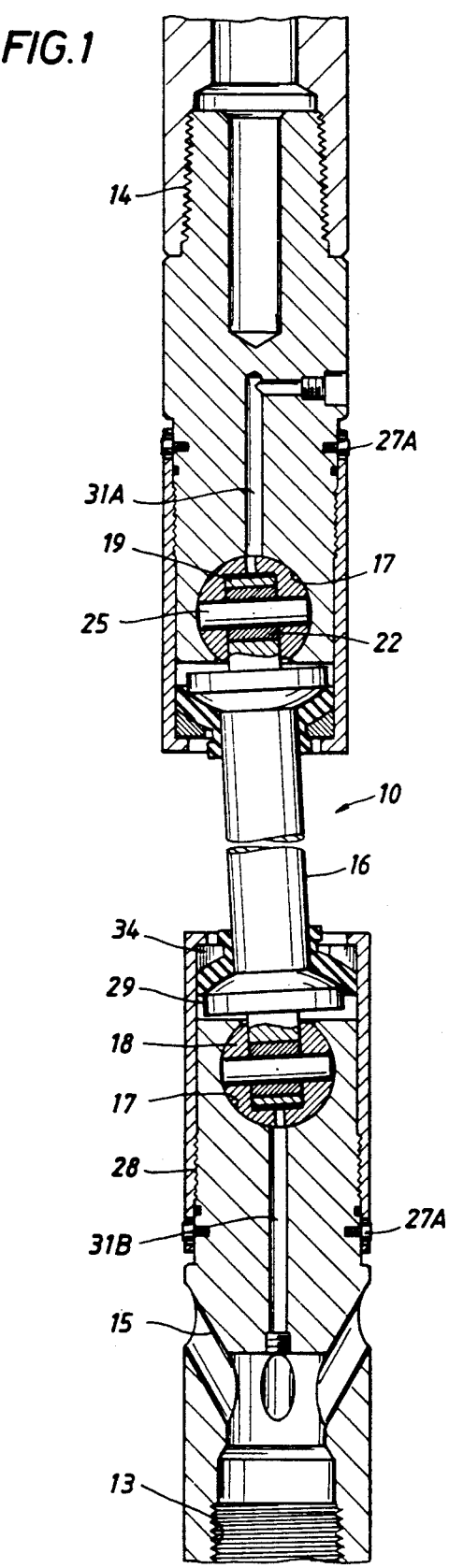
FIG. 1 is a vertical sectional view of apparatus constructed in accordance with a preferred embodiment of the invention, and showing the torque bar having its opposite ends connected by the universal joints to the upper and lower subs whose axes are offset with respect to one another.
Figure 2:
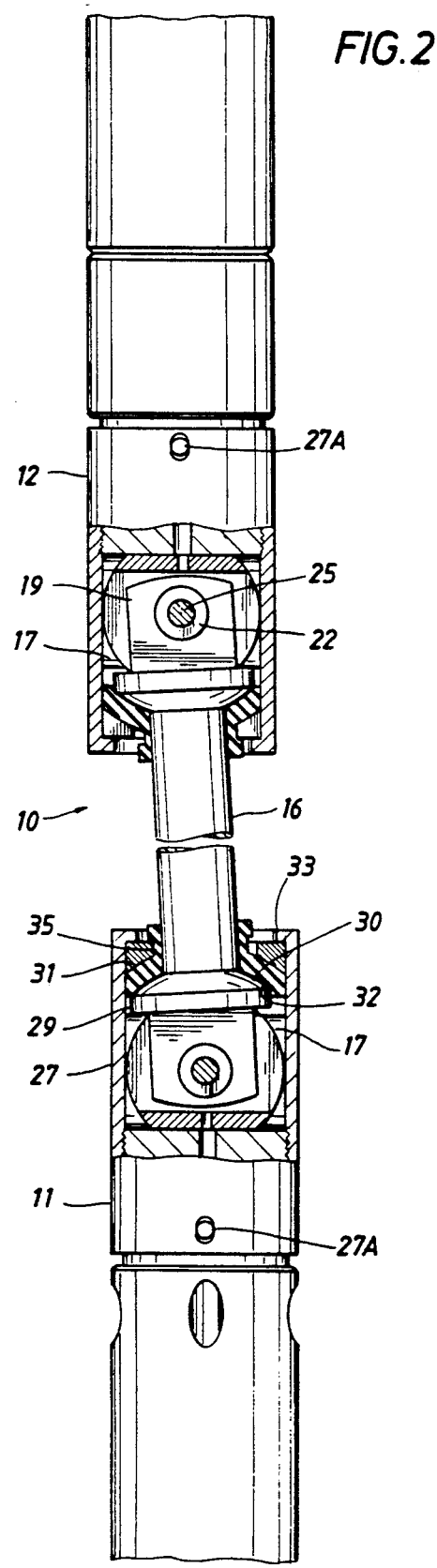
FIG. 2 is a vertical section view of the apparatus of FIG. 1, as seen along a plane at right angles to FIG. 1.

With reference now to the details of the described above drawings, the overall apparatus shown in FIGS. 1 and 2, and designated in its entirety by reference character 10, comprises lower and upper members 11 and 12 adapted to be connected, respectively, to a lower part rotatable about a fixed vertical axis and an upper part adapted to rotate in a circular path about the fixed axis. As previously described, the lower member may comprise a first sub connectible, as by means of a threaded box 13 at its lower end, to a bit shaft rotatable within the lower end of a drill string extending downwardly within a wellbore from the Earth's surface, and the upper member may comprise a second sub connected by a pin 14 on its upper end to the lower end of a rotor of a drilling motor adapted to move in a circular path about the axis of the lower sub within a stator connected as part of the string.

Thus, as well known in the art, the rotor follows as epicycloidal path within the stator of the pump and is connected to a shaft for rotating the bit in response to the circulation of drilling fluid downwardly between the rotor and stator and out the lower end of the bit for circulation back up to the Earth's surface through the annulus between the drill string and the well bore. For this purpose, ports 15 are formed in the lower sub 11 to connect its bore with that of the shaft and thus the bit. The shaft is conventionally mounted in thrust bearings in the lower end of the drill string which maintain the bit for rotation in the described axis.

As also previously described, the apparatus further comprises a torque bar 16 which is connected at its opposite ends to each of the subs 11 and 12 by means of a universal joint which is constructed in accordance with the present invention. Thus, a cylindrically shaped recess 17 is formed in the lower end of the sub 12 and in the upper end of the sub 11. As also previously described, each joint further includes a cylindrically shaped body 18 which fits closely within the recess 17 which extends for greater than 180 degrees so as to retain the body 18 against movement through its open end. Thus, the body 18 is free to rotate within the recess about a first axis extending transversely of each the subs 11 and 12 and thus is perpendicular to the axis about which the sub itself is rotated.

Each joint further includes a tongue 19 on the end of the torque bar 16 for fitting closely within the sides 20 of a slot formed in the body 18 opposite the open end of the sub. This tongue has an opening 21 therethrough which closely receives a bearing sleeve 22, and the bearing sleeve, and thus the tongue 19, as well as the sides of the body 18 on opposite sides of the slot 20, have holes 23 and 24 therethrough which are aligned with one another when the tongue 19 is received in the slot with its upper end spaced a short distance from the upper end of the slot, as shown in FIG. 2. A pin 25 is received closely through the aligned holes 23 and 24 so as to permit the tongue 19, and thus the adjacent end of the torque bar 16, to be rotated about an axis which is perpendicular to the axis of the sub as well as perpendicular to the axis about which the cylindrically shaped body 18 is rotatable. More particularly, these axes intersect one another so that, as previously described, the universal joint is of a constant velocity type. That is, the axis of the sub is always perpendicular to the axis of the cylindrical body, and the axis of the cylindrical body is always perpendicular to the axis of the pin, even though the axis of the sub is not always perpendicular to the axis of the pin.

Each body 18 is retained in the recess 17 of the sub by means of a sleeve 27 threadably connected to threads 28 about the body of the sub in which the recess 17 is formed. The ends 26 of the body are formed spherically about the intersection of the axis of rotation of the cylindrical body and the axis of the sub so as to fit closely within the radius of sleeve 27, as shown in FIG. 2.

As also previously described, the torque bar 16 also has a pair of enlarged heads 29 formed thereon adjacent the tongue 19 at each end of the bar. More particularly, each such enlarged head has a spherical surface 30 formed on its side opposite the tongue which is concentric to the intersection of the first and second axes of rotation of the joint.

As shown and as previously described, this spherical surface is surrounded by a boot 31 of rubber or other suitable deformable material having a surface 32 conforming to that of the surface 30 and an outer diameter sized to fit tightly within the end of the sleeve 27. Thus, when retained with its surface 32 engaged with the surface 30 of the enlarged head, and its outer diameter engaged with the inside of the sleeve 27, the boot forms a seal between the torque bar and sleeve so as to close off the space within the sub in which the relatively sliding parts of the joint are formed, thus protecting them against damage by the drilling fluids circulating past the universal joints. Additionally, the boot services to contain lubricant which is injected into the space surrounding the spherically shaped body through passageways 31A in the sub 12 and 31B in sub 11.

The end of the sleeve 27 has an inturned flange 33 which retains split retainer rings 34 between the flange and the side of the boot opposite the surface 32 thereof. More particularly, the rings are of such size to permit them to be assembled about a neck 35 of the boot and thus hold the inner diameter of the neck closely about the outer diameter of the torque bar 16. As will be understood, with the parts of the joint assembled, as described, the threading of sleeve 27 on the body portion of each sub will bring the spherical surface 32 of the boot tightly against the spherical surface 30 of the enlarged head at the end of the torque bar. As shown, the boot is, like the retainer ring, made of parts which are split about their circumference, preferably along a bias, which are adapted to be assembled over the torque bar beneath the enlarged head. Set screws 27A prevent the sleeves 27 from backing off.

Figure 3:
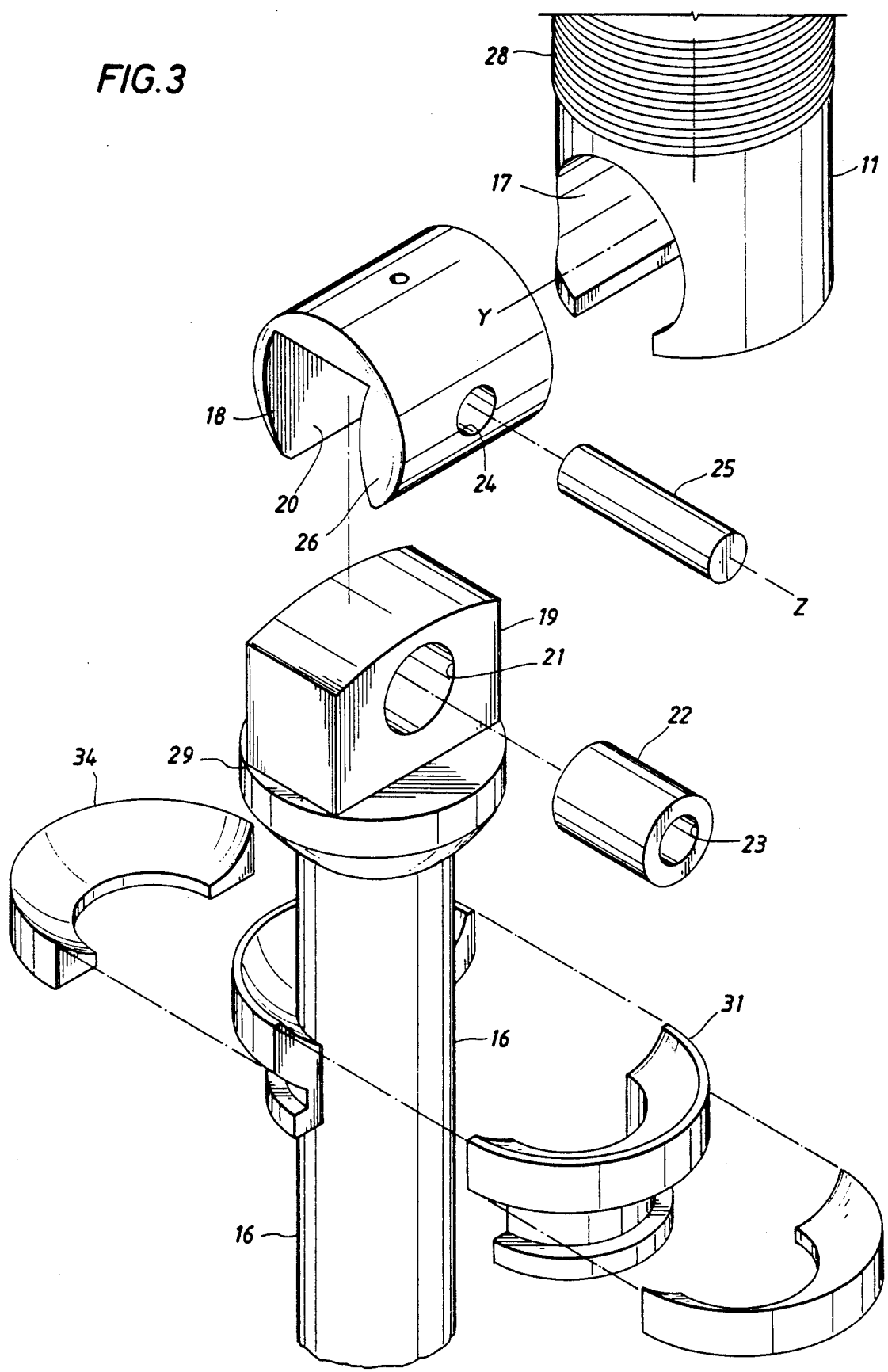
FIG. 3 is an enlarged, exploded view of one of the universal joints of the apparatus of FIGS. 1 and 2.

As previously described, and as will be better understood from FIG. 3, disassembly of each joint merely requires the removal of sleeve 27 from about the body portion of the sub as to uncover the ends of the cylindrically shaped body 18. This then permits the cylindrically shaped body as well as the tongue 19 on the end of the torque bar to be moved laterally with it out of the recess 17 in the end of the sub. At this time, the pin 25 may be removed from within the holes 23 and 24 to permit disconnection of the cylindrically shaped body 18 and the tongue 19 on the end of the torque bar. This easy assembly and dissembly procedure will, of course, be beneficial not only in the original installation of the apparatus, but also in the replacement of worn or otherwise damaged parts.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A constant velocity torque transmitting universal joint, comprising
    a first member having an opening in one end and a cylindrically shaped recess extending transversely of the opening,
    cylindrically shaped body means closely received in said recess for rotation about a first axis and having a slot in one side with parallel sides and holes on opposite sides of the slot,
    a pin extending into the holes in the body means and across the slot along a second axis perpendicular to and intersecting the first axis, and
    a second member having a tongue with flat sides closely fitting within the slot and a hole therethrough closely fitting about the pin for rotation about the second axis,
    said second member also having an enlarged head with a spherical surface adjacent the tongue which is concentric to the intersection of said first and second axes, and
    a flexible boot mounted on said second member and having a spherical surface which closely surrounds the spherical surface on the head to close a space between the members.

2. A universal joint of the character defined in claim 1, wherein the first member comprises
    a body portion through which the cylindrically shaped recess is formed,
    a sleeve closely surrounding and releasably connected about the body portion, and
    means retaining the boot within the sleeve outwardly of the head on the second member.

3. A universal joint of the character defined in claim 2, wherein
    the boot is split about its circumference for assembly about the second member, and
    the retaining means comprises
    split rings which fit about the boot, and
    a flange or the sleeve engaging an outer side of the split rings.

4. Apparatus for use in transmitting torque between a first part rotatable about a fixed axis and a second part rotatable in a circular path about the axis, comprising
    a first sub connectible at one end to the first part for rotation therewith and having an opening in the other end,
    a second sub connectible at one end to the second part for rotation therewith and having an opening in the other end,
    a torque bar, and
    a universal joint connecting each end of the torque bar to one of the subs respectively, including
    a cylindrically shaped recess extending transversely of the opening in the end of the sub,
    cylindrically shaped body means closely received in said recess for rotation about a first axis and having a slot in one side having parallel sides and holes on opposite sides of the slot,
    a pin extending into the holes in the body means and extending across the slot along a second axis perpendicular to and intersecting the first axis, and
    a tongue on the end of the torque bar having flat sides closely fitting within the slot and a hole therethrough closely receiving the pin for rotation about the second axis,
    each end of said torque bar also has an enlarged head with a spherical surface adjacent the tongue which is concentric to the intersection of said first and second axes, and
    a flexible boot is mounted on each sub and has a spherical surface which surrounds the bar to close a space between the bar and sub.

5. Apparatus of the character defined in claim 4, wherein
    each sub comprises
    a body portion connectible to one of the first and second parts, respectively and in which the cylindrically shaped recess is formed,
    a sleeve closely surrounding and releasably connected to the body portion, and
    means retaining the boot within the sleeve outwardly of the head on the torque bar.

6. Apparatus of the character defined in claim 5, wherein
    the boot is split about its circumference for assembly about the torque bar, and
    the retaining means comprises
    split rings which fit about the boot, and
    a flange on the sleeve engaging an outer side of the split rings.

* * * * *